March 18, 1930.  L. S. BESSONETT  1,750,790
COUPLING
Filed March 23, 1925

Inventor
Leland S. Bessonett
By Lyon & Lyon
Attorneys

Patented Mar. 18, 1930

1,750,790

UNITED STATES PATENT OFFICE

LELAND S. BESSONETT, OF SAN FRANCISCO, CALIFORNIA, ASSIGNOR, BY MESNE ASSIGNMENTS, TO STANDARD OIL COMPANY OF CALIFORNIA, A CORPORATION OF DELAWARE

COUPLING

Application filed March 23, 1925. Serial No. 17,651.

This invention relates to couplings, and is more particularly directed to a coupling for use on the suction hose of a crank case oil draining apparatus as described in the copending application of Henry Deward Collier, Serial Number 691,861, filed February 9, 1924, for System and apparatus for drawing lubricant from motor vehicles.

The principal object of this invention is to provide a coupling adapted to be secured to a suction hose or line so that the same may be readily and easily attached to and detached from a conduit through which it is desired to draw a fluid and which is provided with means for preventing the jamming or drawing of the tube into the conduit.

Other objects and advantages of this invention will be apparent from the following detailed description of a preferred embodiment thereof, as illustrated in the accompanying drawings.

Figure 1:
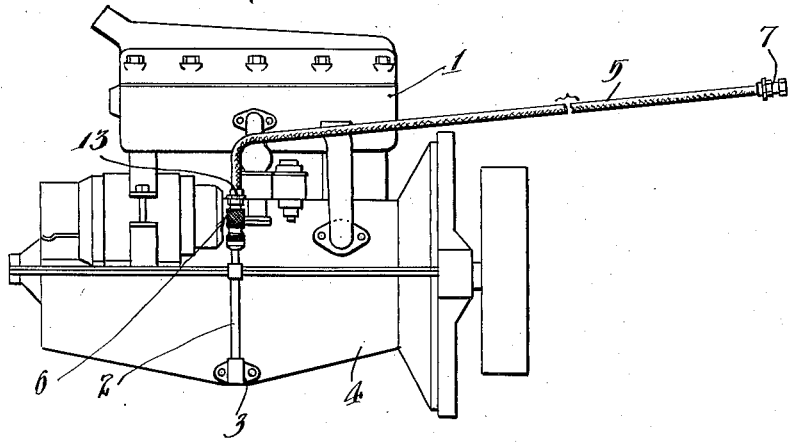
Fig. 1 is a side elevation of a motor vehicle engine from which it is desired to draw the lubricant in accordance with the system as set forth in the copending application of Henry Deward Collier, above referred to, illustrating a nozzle as embodied in this invention as in use for connecting the flexible hose to the discharge pipe or conduit.
Figures 2, 3:
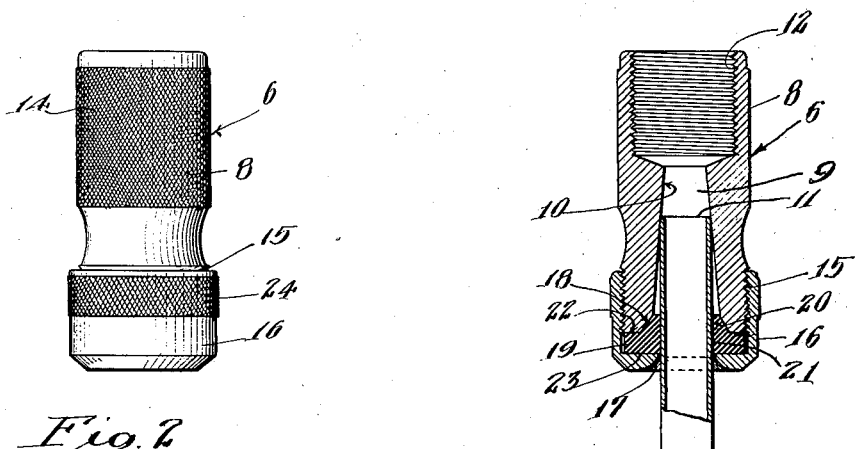
Fig. 2 is an enlarged side elevation of a coupling embodying this invention.
Fig. 3 is a central sectional side elevation thereof illustrating the same as coupled with a fragment of a pipe or conduit.
Figure 4:
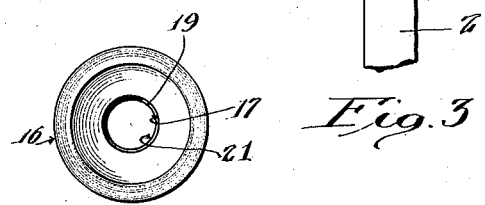
Fig. 4 is a bottom plan view thereof.

In the preferred embodiment of this invention shown in the drawings, 1 generally indicates a motor vehicle engine to which a conduit 2 is connected by means of a fitting 3 so as to provide a communication of the conduit 2 with the interior of the case 4 at or near the lowest level in the case 4. A hose 5 connected to a suitable source of reduced pressure or suction is connected by means of a coupling 6 to the pipe 2 so as to draw the lubricant from within the case 4. The hose 5 is connected by means of the coupling 7 with any suitable form of suction device, not shown. The coupling 6 is formed of a body 8 having a central passage 9. The central passage 9 is tapered as illustrated at 10 so as to engage the upper end 11 of the tube 2 to prevent the same being drawn within or jammed into and through the body 8 thereof and so that the passage 9 may receive a pipe 2 of considerable variation in diameter. The body 8 is provided with threads 12 into which a coupling 13 secured to the end of the hose 5 is screw threaded. The body 8 is knurled as illustrated at 14 so as to enable easy manipulation thereof. The lower end of the body 8 is externally threaded as illustrated at 15 to receive a cap 16 which cap 16 has a central countersunk bore as illustrated at 17 through which the pipe 2 is inserted. The end of the passage 9 is tapered outwardly as illustrated at 18, to provide an annular tapered seat for a washer 19 which washer 19 is formed with a frusto-conical portion 20 adapted to be engaged with the seat 18 and has a central bore 21 through which the pipe 2 is inserted. The washer 18 is engaged by the end 22 of the body 8 and by the inner surface 23 of the cap 16 so that as the cap 16 is screw threaded onto the body 8 the washer 18 is forced into the passage 9 of the body 8 and forms a fluid-tight connection with the tube 2. The cap 16 is likewise knurled as illustrated at 24 so as to enable easy threading thereof to the body 8.

It will be apparent from the foregoing that applicant has provided a simple and efficient coupling well adapted to prevent the same from being forced over the pipe to which it is connected either by the operator or by the suction exerted therethrough.

Having fully described a preferred embodiment of this invention, it is to be understood that it is not intended that the same should be limited to the exact construction herein set forth, which may obviously be varied in detail without departing from the spirit of the appended claim.

I claim:

A suction hose coupling comprising a body having a tapered central passage, means for securing the body to a flexible conduit, a packing ring mounted within the tapered central passage at one end thereof and adapted to seat upon a seat formed within the body so that the packing ring will extend into said central passage at the end of the central passage, and means secured to said body for holding the packing ring in position, said latter means having a central bore larger than the bore of the packing ring so as to permit tubes of variant diameters to be removably inserted through the packing ring to engage the tapered walls of the bore of the said body to hold said tubes from being drawn through the body.

Signed at San Francisco, California, this 12th day of March, 1925.

LELAND S. BESSONETT.